United States Patent [19]

Tominaga

[11] Patent Number: 5,495,498
[45] Date of Patent: Feb. 27, 1996

[54] SPREAD SPECTRUM COMMUNICATION APPARATUS

[75] Inventor: Hideo Tominaga, Kasuga, Japan

[73] Assignee: Matsushita Electric Industrial Co., Ltd., Osaka, Japan

[21] Appl. No.: 273,432

[22] Filed: Jul. 11, 1994

[30] Foreign Application Priority Data

Jul. 27, 1993 [JP] Japan .................................. 5-203745

[51] Int. Cl.⁶ .................................................... H04B 1/69
[52] U.S. Cl. ........................ 375/200; 375/205; 375/206; 375/365; 375/367
[58] Field of Search .............................. 375/1, 200–210, 375/362, 365, 366, 367; 380/34

[56] References Cited

U.S. PATENT DOCUMENTS

4,383,322  5/1983  Halpern et al. .............................. 375/1
5,177,766  1/1993  Holland et al. .............................. 375/1

Primary Examiner—Bernarr E. Gregory
Attorney, Agent, or Firm—Stevens, Davis, Miller & Mosher

[57] ABSTRACT

In a spread spectrum communication apparatus, frame synchronization is established by inserting data for frame synchronization as a part of a synchronization word of a transmission frame on a sending side and detecting the data for frame synchronization from reproduction data of a reception frame on a receiving side. A frame synchronization pseudo-noise train generator section generates a pseudo-noise train for frame synchronization used as the frame synchronization data. A frame synchronization correlator section receives the pseudo noise train for frame synchronization and reproduction data to output a signal when the value of correlation of the pseudo noise train for frame synchronization and the reproduction data is not smaller than a reference value. A reception frame timing generator section outputs a reception synchronization word timing signal with the output signal of the frame synchronization correlator section being taken as a reference.

4 Claims, 9 Drawing Sheets

SPREAD SPECTRUM COMMUNICATION APPARATUS

BACKGROUND OF THE INVENTION

1. Field of the Invention

The present invention relates to a spread spectrum communication apparatus using a TDD (Time Division Duplex) system, and more particularly to such an apparatus in which a synchronizing section is constructed such that frame synchronization can be made rapidly and stably.

2. Description of the Related Art

In recent years, a spread spectrum (SS) system has began to be utilized IN not only military communication but also public communication and personal communication since the system has advantageous properties such as random multiple-accessibility, speech confidentiality, interference resistance, and so forth. Particularly, the investigation of practical use of a spread spectrum communication using the TDD system has been advanced since it is easy to increase the number of channels.

Figure 1A:
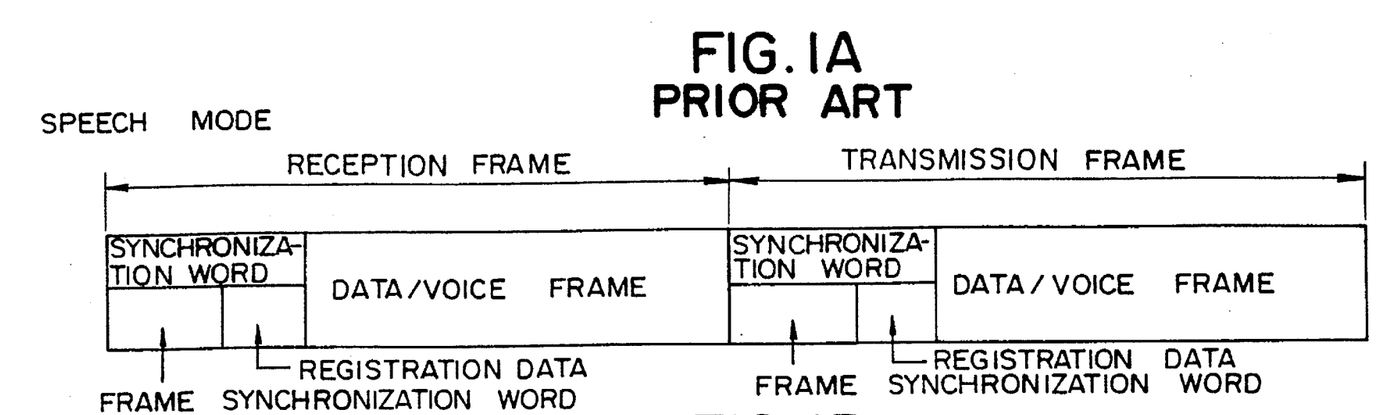
FIGS. 1A to 1C are diagrams showing a frame construction used in the conventional spread spectrum communication apparatus.
Figures 1B, 1C:
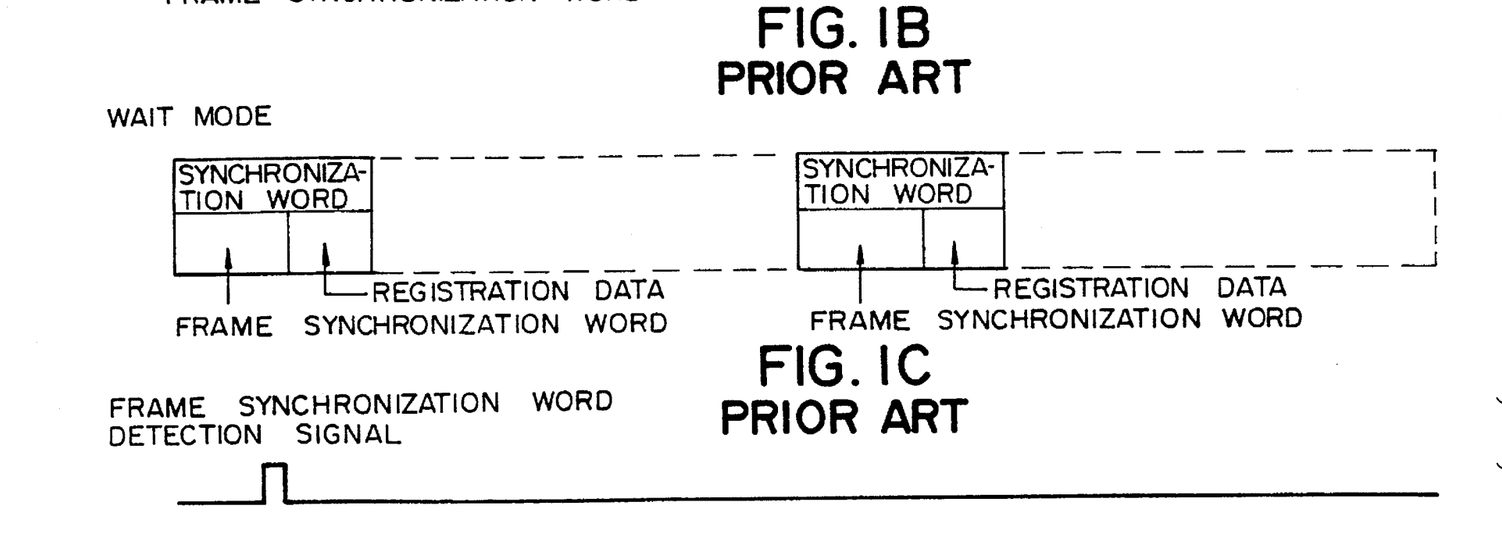

In the TDD system, data is transmitted in such a manner that transmission and reception are made in a time division manner with a transmission frame and a reception frame being formed, as shown in FIGS. 1A to 1C. The frame is composed of a synchronization word for establishing synchronization and a data/voice frame for transmitting information.

Generally, in the spread spectrum communication, the synchronization word and data of the data/voice frame are spread by spread codes, respectively. Also, the synchronization with a bit signal arranged in the synchronization word is made to establish bit synchronization within one synchronization word.

However, that bit in the synchronization word at which the catch of bit synchronization is completed, depends on the situation of a transmission path. Accordingly, the time instant of establishment of the bit synchronization and the time instant of start of a frame do not have a fixed relationship therebetween.

Therefore, a frame synchronization word is inserted in the synchronization word, as shown in FIGS. 1A and 1B, so that the establishment of frame synchronization is made on the basis of the frame synchronization word. Also, registration data is inserted in the synchronization word. The registration data is data for enabling CDMA (Code Division Multiple Access) in the data/voice frame.

Figure 2:
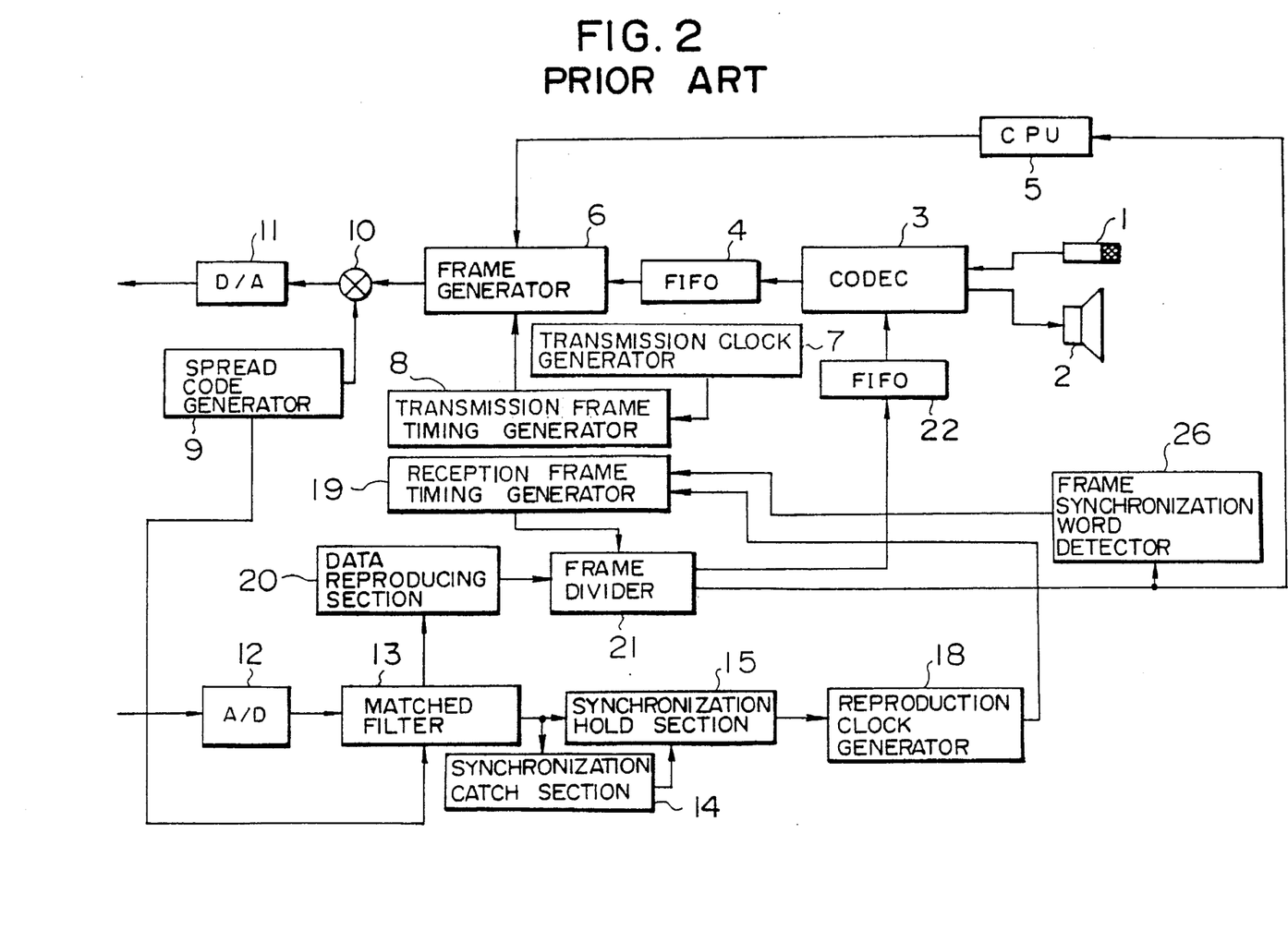
FIG. 2 is a block diagram showing the construction of a synchronizing section of a base station or parent equipment of the conventional spread spectrum communication apparatus.

The construction of a base station or parent equipment in the conventional spread spectrum communication apparatus is shown in FIG. 2. The base station or parent equipment is provided with a microphone 1, a speaker 2, a CODEC section 3 for making a conversion between a voice and a voice signal, and a CPU section 5 for making the input/output of control data and controlling the whole of the system on the basis of the control data.

A sending block includes a FIFO (First-in First-out) 4 for making the velocity conversion of a transmit voice signal, a frame generator section 6 for generating a transmission frame, a transmit clock generator section 7 for generating transmission clocks which provide reference clocks of the system, a transmission frame timing generator section 8 for generating a timing necessary for the generation of a transmission frame, a spread code generator section 9 for generating a spread code in units of one chip, one-bit data being spread by the spread code into several-ten to several-thousand chips, a multiplier section 10 for multiplying transmit data by the spread code, and a D/A converter section 11 for converting a transmission baseband digital signal into a transmission baseband analog signal.

A receiving block includes an A/D converter section 12 for converting a reception baseband analog signal into a reception baseband digital signal, a matched filter 13 inputted with the reception baseband digital signal and the spread code to make an inverse spread of the reception baseband digital signal, a synchronization catch section 14 for outputting a bit synchronization catch completion signal when the inversely-spread signal (or the value of correlation) is not smaller than a reference value, a synchronization hold section 15 for receiving the synchronization catch completion signal to perform synchronization hold, a reproduction clock generator section 18 for outputting reproduction clock signals synchronous with the reception baseband signal from a VCO (voltage controlled oscillator) in a synchronization holding condition, a reception frame timing generator section 19 for generating a timing for necessary of the reproduction of a reception frame, a data reproducing section 20 for performing data reproduction, a frame divider section 21 for dividing the reception frame into reception reproduction data for control and a reception voice signal, an FIFO 22 for making the velocity conversion of a reception voice signal, and a frame synchronization word detector section 26 for detecting a frame synchronization word in the reception reproduction data outputted from the frame divider section 21 to output a frame synchronization word detection signal.

Figure 3:
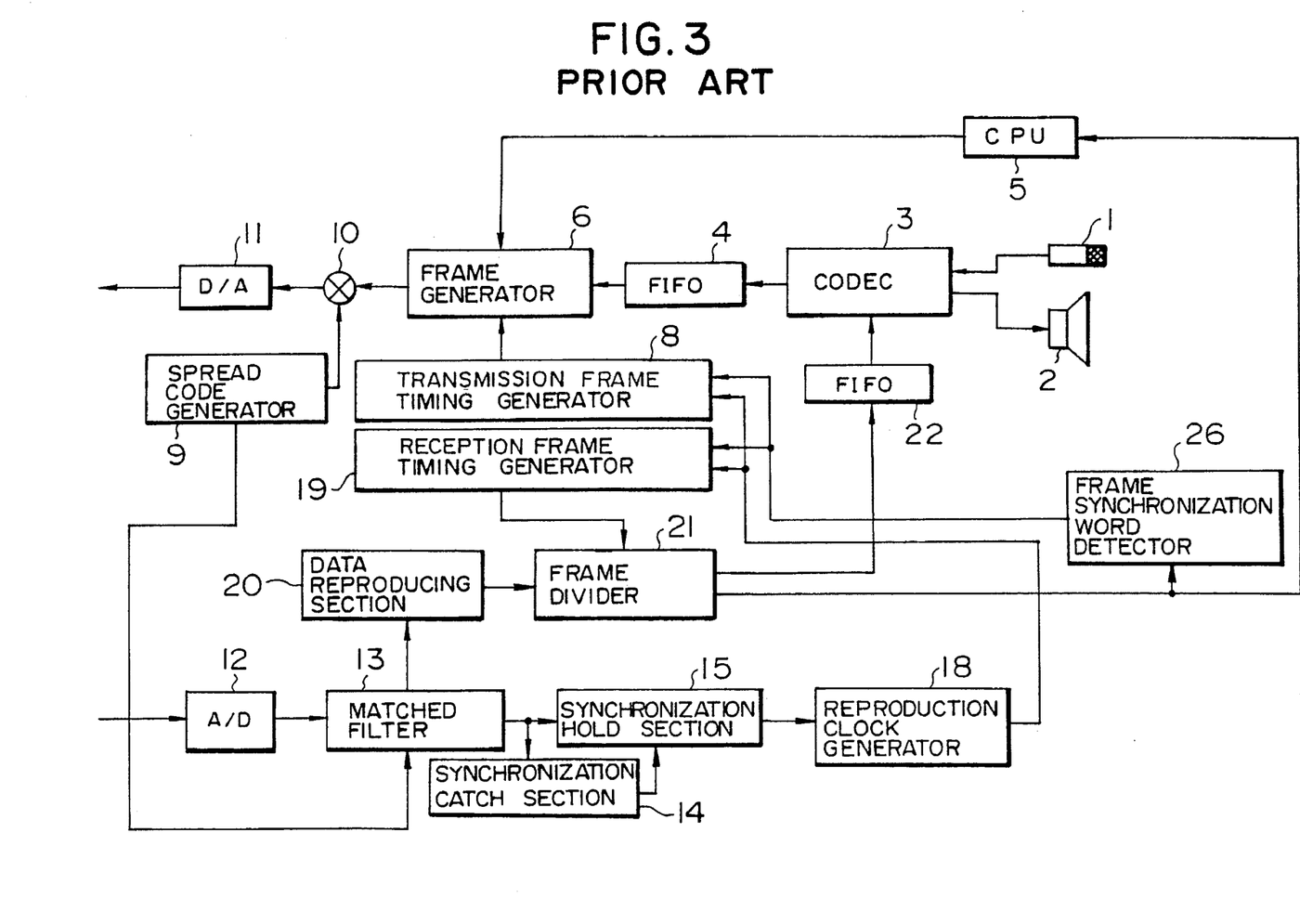
FIG. 3 is a block diagram showing the construction of a synchronizing section of a terminal of the conventional apparatus.

Unlike the base station or parent equipment (shown in FIG. 2), a terminal is not provided with the transmission clock generator section 7, as shown in FIG. 3. Instead, a transmission frame timing generator section 8 receives reproduction clock signals from a reproduction clock generator section 18 and a frame synchronization word detection signal for count-reset from a frame synchronization word detector section 26. The other construction of the terminal is the same as the construction of the base station or parent equipment.

Next, a synchronization establishing operation of the spread spectrum communication apparatus will be explained by use of FIGS. 2 and 3.

In the spread spectrum communication apparatus, reference clock signals providing the reference of the whole of the system are outputted from the transmission clock generator section 7 of the base station or parent equipment.

A basic form of communication between the base station or parent equipment and the terminal is such that the base station or parent equipment sends a transmission frame over a period of time allotted in a time division manner and the terminal receives the sent transmission frame as a reception frame. Next, the terminal sends a transmission frame over a period of time allotted in a time division manner and the base station or parent equipment receives the sent transmission frame as a reception frame. This is repeatedly carried out.

A transmit/receive processing performed by the terminal will now be explained by use of FIG. 3. First, when a power supply of the terminal is turned on, the terminal takes a wait mode (see FIG. 1B) until call-out or call-in is generated. In the wait mode, the transmission and reception of only the synchronization word is made in order to reduce the power consumption of the terminal. At this time, data of the synchronization word includes a frame synchronization word and registration data between communication apparatuses in the system (or data concerning the registration for the base station or parent equipment, spread codes used in a data/voice frame and the approval of speech).

In FIG. 2, when a transmission frame is sent from the base station or parent equipment, a change from a receive frame to a transmission frame is made by transmit I clock signals of the transmit clock generator section 7 which provide reference clock signals of the entire system. In this case, even if the reception is being made, the reception frame is discontinued.

The transmission frame timing generator section 8 shown in FIG. 2 outputs a transmission frame timing signal on the basis of the transmission clock signals outputted from the transmission clock generator section 7, in order to form the transmission frame as shown in FIGS. 1A to 1C. On the other hand, the CPU section 5 outputs a frame synchronization word and registration data.

The frame generator section 6 shown in FIG. 2 forms a transmission frame on the basis of the transmit frame timing signal outputted from the transmission frame timing generator section 8 and outputs it as transmission data. The multiplier section 10 multiplies the transmission data outputted from the frame generator section 6 by a spread code outputted from the spread code generator section 9 and outputs it as a transmission baseband digital signal. The D/A converter section 11 converts the transmission baseband digital signal into a transmission baseband analog signal which is in turn send to the line.

Next, when a reception frame in the wait mode is inputted to the terminal shown in FIG. 3, the A/D converter section 12 converts a reception baseband analog signal into a reception baseband digital signal which is in turn outputted. The matched filter 13 receives the reception baseband digital signal and a spread code outputted from the spread code generator section 9 so that the reception baseband digital signal is inversely spread to output a correlation value. On the basis of the correlation value outputted from the matched filter 13, the synchronization catch section 14 makes the judgement of whether or not bit synchronization is established. When the correlation value is not smaller than a reference value, the synchronization catch section 14 outputs a synchronization catch completion signal, judging the bit synchronization as being established.

When the synchronization catch completion signal outputted from the synchronization catch section 14 is received, the synchronization hold section 15 performs the holding of bit synchronization. Generally, the synchronization hold section 15 is constructed by a DLL (Delay Locked Loop) and is capable of synchronization hold at a precision which is not larger than $\pm\frac{1}{2}$ chips for one bit. Also, the synchronization hold section 15 outputs an error signal indicating an error between the correlation value outputted from the matched filter 13 and the reference value. The reproduction clock generator section 18 receives the error signal to control the voltage controlled oscillator VCO incorporated therein so that reproduction clock signals are outputted at the above-mentioned precision.

The data reproducing section 20 receives the reception data inversely spread by the matched filter 13 and outputs correct reproduction data after the synchronization catch section 14 has completed the catch of synchronization by outputting the synchronization catch completion signal. The frame divider section 21 receives a reception frame timing signal outputted from the reception frame timing generator section 19 so that the reception frame is divided, as shown in FIGS. 1A to 1C, to output reception reproduction data.

Namely, the reception frame is composed of a synchronization word, a data frame and a voice frame, as shown in FIG. 1A, and the frame divider section 21 outputs the voice frame to the FIFO 22 and outputs the synchronization word and the data frame to the CPU section 5.

The frame synchronization word detector section 26 extracts the frame synchronization word from the reception reproduction data outputted from the data reproducing section 20 to output a frame synchronization word detection signal (see FIG. 1C).

The transmission frame timing generator section 8 or the reception frame timing generator section 19 receives the frame synchronization detection signal as a reset signal to newly start a counting operation based on reproduction clock signals and outputs a transmission frame timing signal or a reception frame timing signal when the count number reaches a fixed number.

Further, registration data outputted from the frame divider section 21 is inputted to the CPU section 5. Thus, the CPU section 5 makes the exchange of data concerning the registration for the base station or parent equipment, spread codes used in a data/voice frame and the approval of speech.

The transmission clock generator section 7 is possessed by only the base station or parent equipment (see FIG. 2). The transmission clock generator section 7 is not provided in the terminal (see FIG. 3). Instead, the transmission frame timing generator section 8 of the terminal receives the reproduction clock signals from the reproduction clock generator section 18 and the frame synchronization word detection signal from the frame synchronization word detector section 26 to generate a transmission timing.

When the transmission frame in the wait mode is to be sent from the terminal, the transmission frame timing generator section 8 of the terminal newly starts a counting operation based on reproduction clock signals with the frame synchronization detection signal being received as a reset signal and outputs a transmission frame timing signal when the count number reaches a fixed number. The CPU section 5 outputs a frame synchronization word and registration data.

The frame generator section 6 receives those signals to form the transmission frame shown in FIG. 1B and outputs the transmission frame as transmission data. The multiplier section 10 multiplies the transmission data by a spread code outputted from the spread code generator section 9 to output it as a transmission baseband digital signal. The D/A converter section 11 converts the transmission baseband digital signal into a transmission baseband analog signal which is in turn outputted.

The reception of the reception frame in the wait mode by the base station or parent equipment is similar to the reception of the reception frame in the wait mode by the terminal.

In general, in order to make sure frame synchronization in the above operation, the transfer to frame synchronization hold is made after the frame synchronization words of several frames in the wait mode are checked.

In the case of a speech mode, the operation of the synchronizing system in the terminal and the base station or parent equipment is basically the same as that explained in the foregoing. In this case, when a user inputs a voice from the microphone 1, the microphone 1 outputs a transmission voice. The transmission voice is converted by the CODEC section 3 into a transmission voice signal which is in turn outputted to the FIFO 4. The FIFO 4 makes the velocity conversion of the transmission voice signal so that the transmission voice signal is taken into a voice frame of the transmission frame. The velocity-converted transmission voice signal is outputted to the frame generator section 6.

The FIFO 22 has an input/output relationship reverse to that of the FIFO 4. The FIFO 22 receives a reception signal before velocity conversion to output a receive voice signal. At this time, the CODEC section 3 receives the reception voice signal to output a reception voice. The speaker 2 receives the reception signal to output a voice.

When the transmission frame is to be sent, the transmission frame timing generator section 8 outputs a transmission frame timing signal. The frame generator section 6 inputted with this transmission frame timing signal outputs transmission data in which a frame synchronization word and registration data are arranged at a predetermined position of the transmission frame and data and a transmission voice signal after velocity conversion are arranged in a data frame. The spread code generator section 9 outputs a spread code, and the multiplier section 10 receives the spread code and the transmission data to output a transmission baseband digital signal after velocity conversion. The D/A converter section 11 converts the transmission baseband digital signal into a transmission baseband analog signal which is in turn outputted.

On the other hand, when a reception frame is received, the A/D converter section 12 converts a reception baseband analog signal into a reception baseband digital signal. Thereafter, the matched filter 13 receives the reception baseband digital signal and the spread code so that the reception baseband digital signal is inversely spread and is then outputted as reception data. The data reproducing section 20 inputted with the reception data outputs reproduction data. The frame divider section 21 inputted with the reproduction data and a reception frame timing signal makes the frame division of the reception frame of the reproduction data to output reception reproduction data and a reception signal before velocity conversion. As has been mentioned in the above, the reception signal before velocity conversion is passed through the FIFO 22 and the CODEC section 3 and is thereafter converted by the speaker 2 into a voice which is in turn outputted. Also, the reception reproduction data is inputted to the CPU section 5 which in turn reflects the result in registration data and data when a transmission frame is sent.

However, the conventional spread spectrum communication apparatus has the following problems in establishing synchronization.

A first problem lies in that since the transfer to the holding of frame synchronization is made after the frame synchronization words of several frames have been checked, a long time is required until the establishment of frame synchronization. If the transfer is made in a short time, the reliability of frame synchronization is deteriorated.

Also, in the case where a frequency deviation between transmission and reception clock signals is large, the following problem is generated. Namely, the transmission and reception between the base station or parent equipment and the terminal is such that the base station or parent equipment sends a transmission frame, the terminal receives this transmission frame as a reception frame, the terminal sends a transmission frame, and the base station or parent equipment receives this transmission frame as a reception frame. In this repeated process, when the terminal is receiving the reception frame, the terminal is capable being synchronous with the transmission clock signals of the base station or parent equipment.

However, when the terminal begins to send the transmission frame, the terminal cannot hold the synchronization with the transmission clock signals of the base station or parent equipment since there is no reception frame. If the terminal sends the transmission frame in a state in which the holding of synchronization is not made, the following may take place. Namely, in the worst case when a frequency deviation between the transmission clock signals of the base station or parent equipment and the transmission clocks of the terminal is large, the base station or parent equipment turns to the transmission frame in a state in which it cannot reception several bits of the last portion of the reception frame. As a result, the base station or parent equipment is not capable of accurate data reproduction.

Further, a general case is that in a wait condition (or before call out or call in), only a synchronization word is communicated in order to reduce the power consumption. In such a case, the problem of frequency deviation becomes greater.

SUMMARY OF THE INVENTION

An object of the present invention is to solve the above-mentioned problems of the prior art or to provide a spread spectrum communication apparatus in which frame synchronization can surely be established fundamentally by the check of a synchronization pattern within one frame and a frequency deviation between transmission clock signals of a base station or parent equipment and transmission clock signals of a terminal can be corrected.

To that end, the present invention provides a spread spectrum communication apparatus in which frame synchronization is established by inserting data for frame synchronization as a part of a synchronization word of a transmission frame on a sending side and detecting the data for frame synchronization from reproduction data of a reception frame on a receiving side, the spread spectrum communication apparatus comprising frame synchronization pseudo-noise train generating means for generating a pseudo-noise train for frame synchronization used as the frame synchronization data, frame synchronization correlation means inputted with the pseudo-noise train for frame synchronization outputted from the frame synchronization pseudo-noise train generating means and reproduction data to output a signal when a value of correlation of the pseudo-noise train for frame synchronization and the reproduction data is not smaller than a reference value, and reception frame timing generating means for outputting a reception synchronization word timing signal with the output signal of the frame synchronization correlation means being taken as a reference.

The apparatus may further comprise integrating means for integrating the reproduction data when the reception sychronization word timing signal is being outputted, and offset setting means for setting an offset value of a control voltage for reproduction clock generating means of the receiving side on the basis of a value of integration outputted from the integrating means.

With the above construction, the rapid and stable holding of frame synchronization becomes possible since the frame synchronization is established by checking the correlation of the pseudo-noise train for frame synchronization.

Also, in the case where a frequency deviation between transmission clock signals (or reference clocks) of a base station or parent equipment and reproduction clock signals of a terminal side is large, the offset setting means sets the offset voltage value for the reproduction clock generating means of the terminal side so that the value of integration by the integrating means becomes large. Thereby, the frequency deviation between transmission and reception clock signals is corrected so that the holding of frame synchronization is stabilized, thereby making it possible to avoid an inconvenience that the base station or parent equipment may be short of reception data.

DESCRIPTION OF THE PREFERRED EMBODIMENTS

In a spread spectrum communication apparatus according to an embodiment of the present invention, transmission/reception based on a TDD system is made using a frame which has a construction shown in FIGS. 4A to 4D. In this frame, a pseudo-noise train for frame synchronization substituted for the frame synchronization word is used for making frame synchronization.

Registration data inserted in a synchronization word is data for enabling CDMA (Code Division Multiple Access) in a data/voice frame as in the conventional apparatus.

Figure 5:
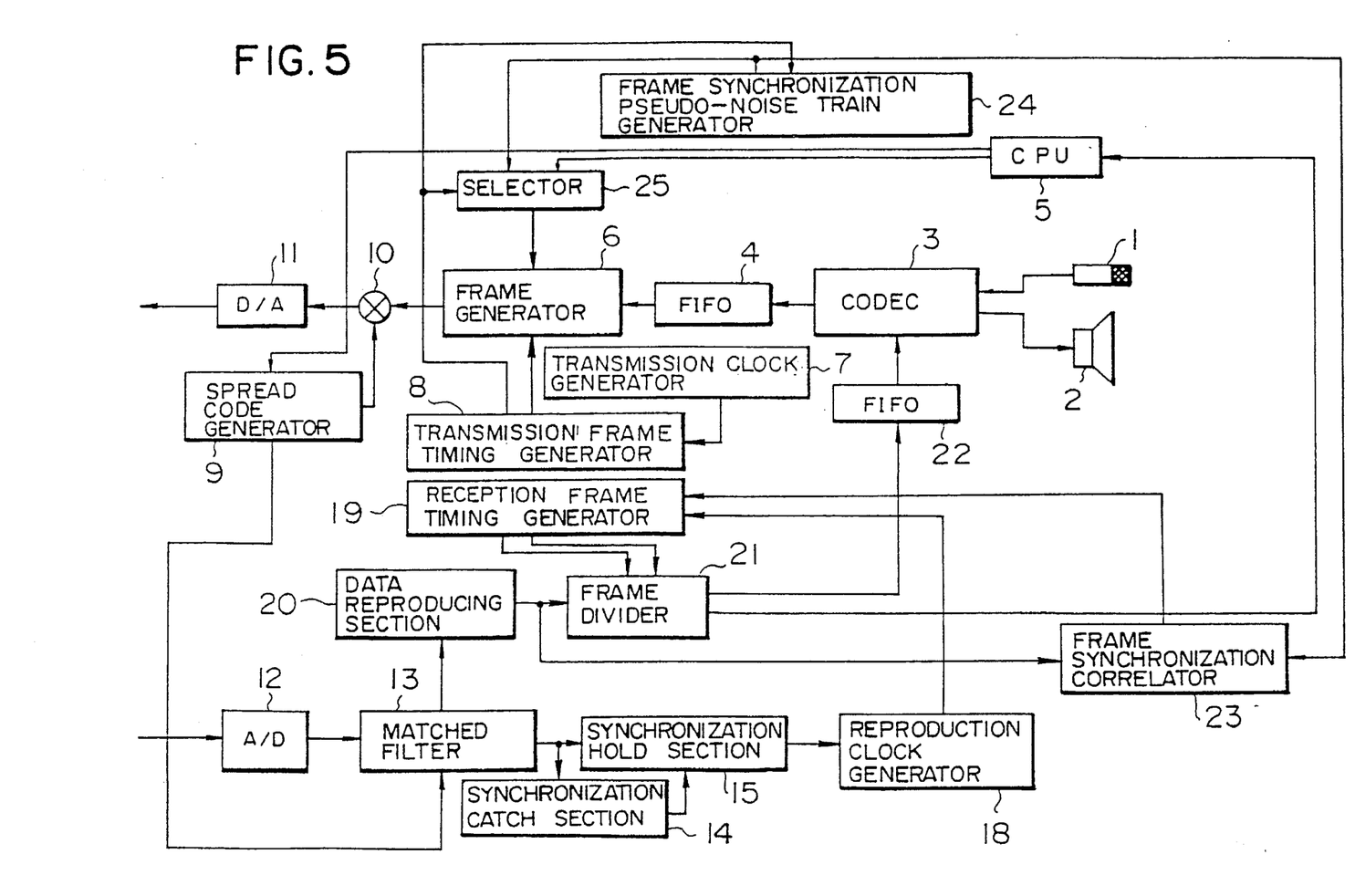
FIG. 5 is a block diagram showing the construction of a synchronizing section of a base station or parent equipment of the spread spectrum communication apparatus in the embodiment of the present invention.

In the spread spectrum communication apparatus of the present embodiment, a base station or parent equipment is provided with a construction for inserting a pseudo-noise train for frame synchronization and registration data in a synchronization word of a transmission frame. As shown in FIG. 5, this construction includes a frame synchronization pseudo-noise train generator section 24 for generating the pseudo-noise train for frame synchronization and a selector 25 for connecting the output of the frame synchronization pseudo-noise train generator section 24 and the output of a CPU section 5 to a frame generator section 6 in a changeover manner. The output of the CPU section 5 supplies the registration data. On the other hand, a receiving side is provided with a construction for detecting the reception of the pseudo-noise train for frame synchronization. This construction includes a frame synchronization correlator section 23 for receiving the pseudo-noise train for frame synchronization outputted from the frame synchronization pseudo-noise train generator section 24 and reception reproduction data outputted from a data reproducing section 20 to output a word correlation value when the value of correlation of the pseudo-noise train for frame synchronization and the reception reproduction data is not smaller than a reference value.

A transmission frame timing generator section 8 outputs a transmission frame timing signal necessary for the generation of a transmission frame to the frame generator section 6 and outputs a transmit synchronization word timing signal (see FIG. 4C) to the frame synchronization pseudo-noise train generator section 24. The transmission synchronization word timing signal defines the instant of time of insertion of the pseudo-noise train for frame synchronization.

A reception frame timing generator section 19 is constructed so as to output a reception frame timing signal necessary for the reproduction of a reception frame and a reception sychronization word timing signal (see FIG. 4D) which represents the instant of time of insertion of the pseudo-noise train for frame synchronization.

The other construction of the base station or parent equipment is the same as that of the conventional apparatus shown in FIG. 2.

Figure 6:
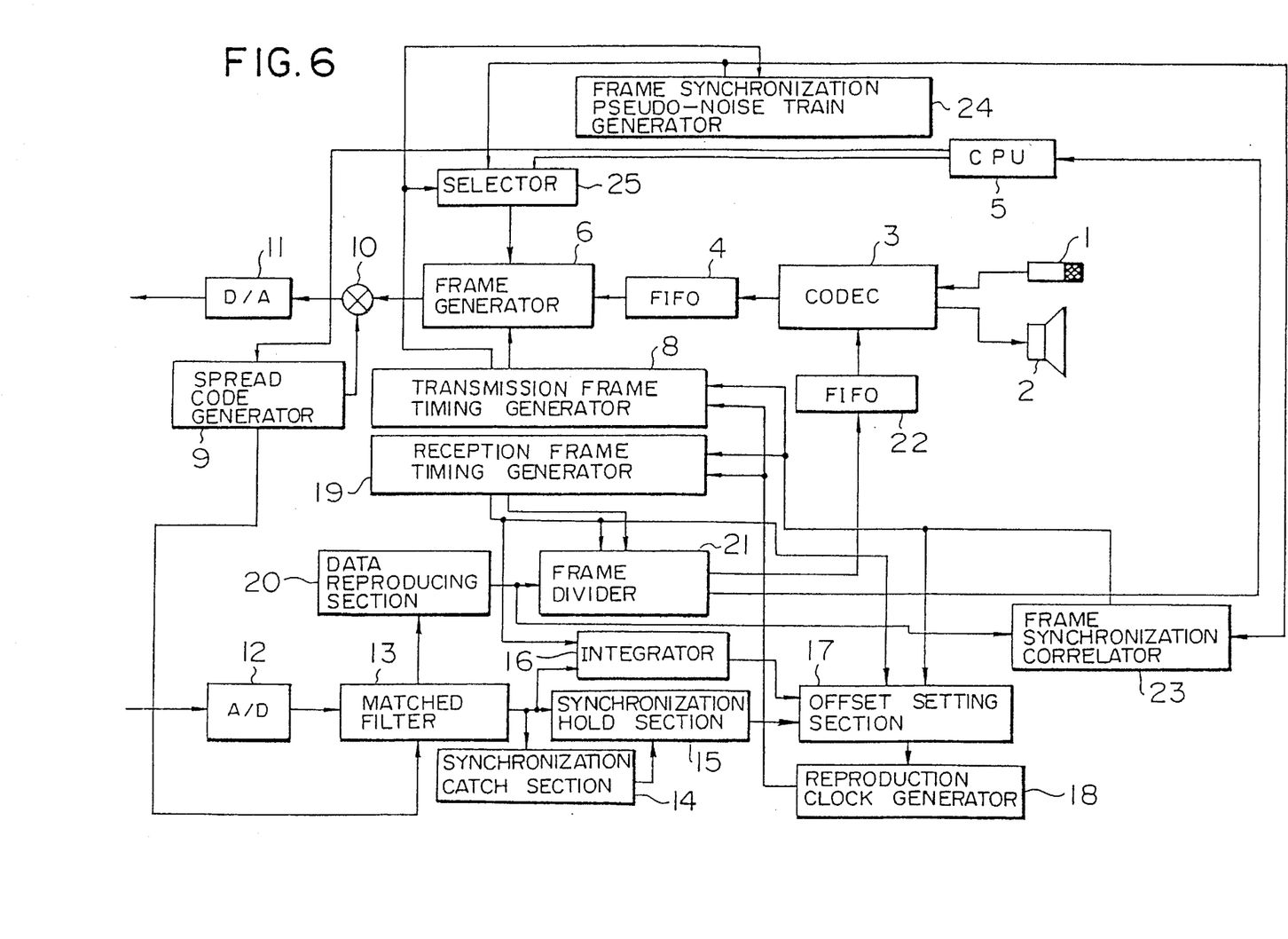
FIG. 6 is a block diagram showing the construction of a synchronizing section of a terminal of the apparatus in the embodiment of the present invention.

The construction of a terminal is shown in FIG. 6. The terminal is provided with an integrator section 16 for cyclically integrating a correlation value, which is outputted from a matched filter 13, for each bit in order to indicate a magnitude of a frequency deviation, and an offset setting section 17 for setting an offset voltage value suitable for the holding of frame synchronization on the basis of an output of the integrator section 16.

Unlike the base station or parent equipment, the terminal is not provided with a transmission clock generator section 7. Thereinstead, signals from a reproduction clock generator section 18 and a frame synchronization correlator section 23 are supplied to a transmission frame timing generator section 8.

The other construction of the terminal is the same as the construction of the base station or parent equipment shown in FIG. 5.

Explanation will now be made of a synchronization establishing operation of the spread spectrum communication apparatus according to the present embodiment.

In the spread spectrum communication apparatus according to the present embodiment, reference clock signals providing the reference of the whole of the system are outputted from the transmission clock generator section 7 of the base station or parent equipment.

First, when a power supply of the terminal is turned on, the terminal takes a wait mode (see FIG. 4B) until call out or call in is generated. In the wait mode, the transmission and reception of only a synchronization word is made in order to reduce the power consumption of the terminal. At this time, the synchronization word includes a pseudo-noise train for frame synchronization and registration data between communication apparatuses in the system, that is, data concerning the registration for the base station or parent equipment, spread codes used in a data/voice frame and the approval of speech (see FIG. 4B).

Figures 4A, 4B:
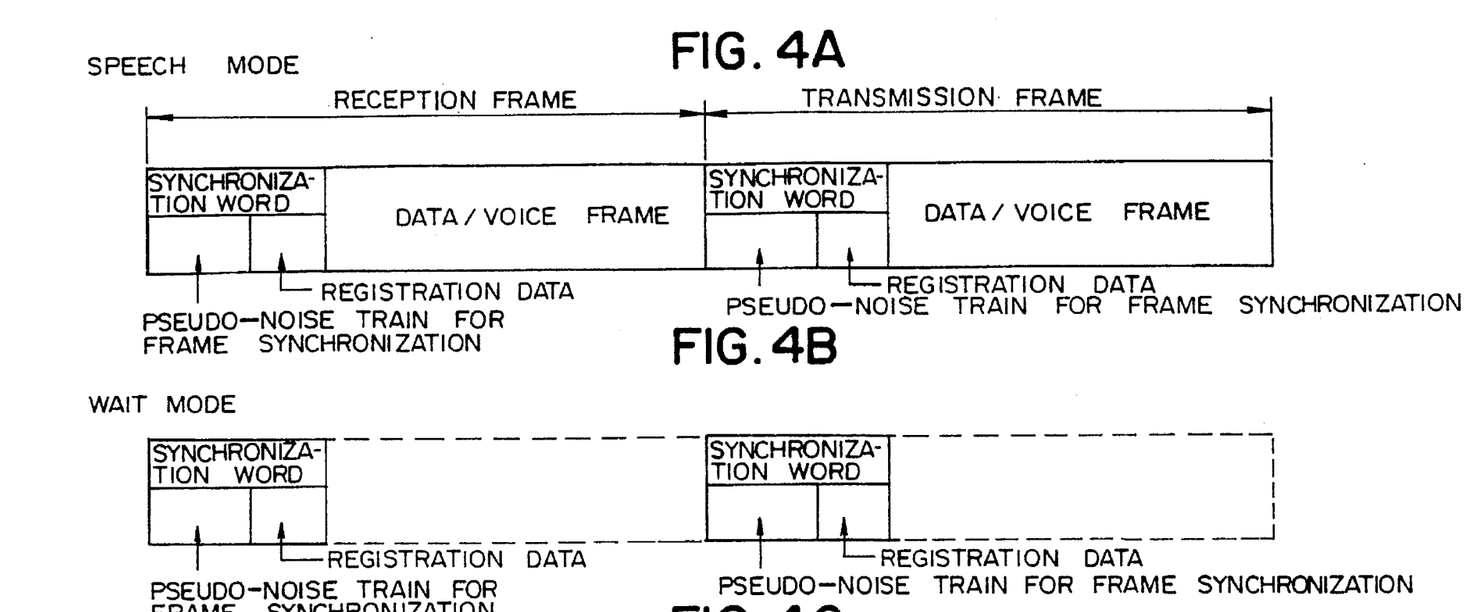
FIGS. 4A to 4D are diagrams showing a frame construction used in a spread spectrum communication apparatus in an embodiment of the present invention.
Figure 4C:
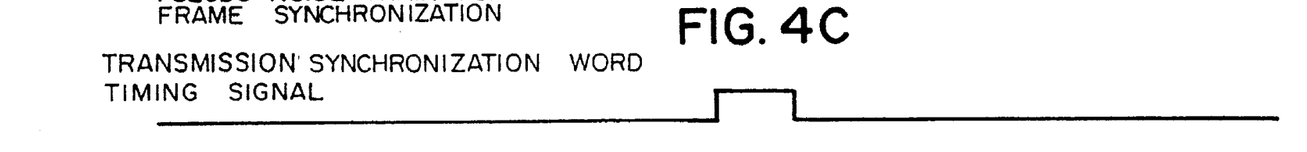
Figure 4D:
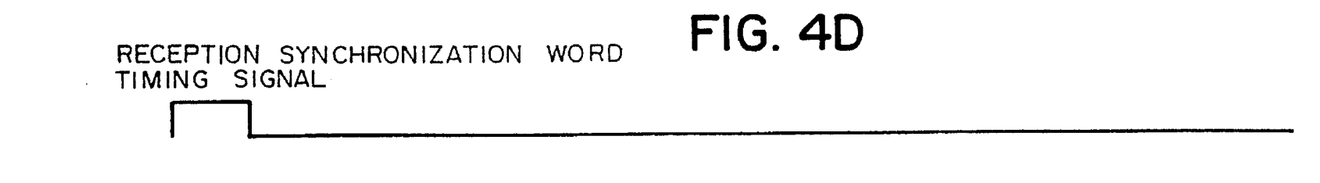

When the base station or parent equipment sends a transmission frame, clock signals generated from the transmission clock generator section 7 provide reference clock signals of the entire system. When the transmission clock signals outputted from the transmission clock generator section 7 are inputted to the transmission frame timing generator section 8, the transmission frame timing generator section 8 outputs a transmission frame timing signal and a transmit synchronization word timing signal shown in FIG. 4C in order to form a transmission frame as shown in FIG. 4A.

The frame synchronization pseudo-noise train generator section 24 outputs a pseudo-noise train for frame synchronization in a period of time when the transmit synchronization word timing signal outputted from the transmission frame timing signal generator section 8 represents high level "H". When receiving the transmission synchronization word timing signal which represents high level "H", the selector 25 outputs the pseudo-noise train for frame synchronization to the frame generator section 6 as it is.

When the transmission synchronization word timing signal is thereafter changed to low level "L", the selector 25 outputs the registration data, which is outputted from the CPU section 5, to the frame generator section 6. The frame generator section 6 forms the transmission frame as shown in FIG. 4A through the changeover of the output of the selector 25 and outputs it as transmission data. A multiplier section 10 multiplies the transmission data by a spread code outputted from a spread code generator section 9 and outputs it as a transmission baseband digital signal. A D/A converter section 11 converts the transmission baseband digital signal into a transmission baseband analog signal which is in turn outputted.

On the other hand, in the terminal receiving a reception frame in a wait mode, an A/D converter section 12 converts an inputted reception baseband analog signal into a reception baseband digital signal. The matched filter 13 inversely spreads the reception baseband digital signal by a spread code outputted from a spread code generator section 9 to output a correlation value. A synchronization catch section 14 outputs a synchronization catch completion signal representative of the catch of bit synchronization when the inputted correlation value is not smaller than a reference value.

After receiving the synchronization catch completion signal, a synchronization hold section 15 starts the holding of bit synchronization and outputs the deviation from bit synchronization as an error signal. Generally, the synchronization hold section 15 is constructed by a DLL (Delay Locked Loop) and is capable of synchronization hold at a precision which is not larger than ±½ chips for one bit. The synchronization hold section 15 also outputs an error signal indicating an error between the correlation value outputted from the matched filter 13 and the reference value. The reproduction clock generator section 18 receives the error signal through the offset setting section 17 to control a voltage controlled oscillator VCO incorporated therein so that reproduction clock signals are outputted at the above-mentioned precision.

The error signal outputted from the synchronization hold section 15 is inputted to the offset setting section 17. The offset setting section 17 outputs the error signal as a control signal for the reproduction clock generator section 18 in a period of time when the error signal is inputted. In a period of time when the error signal is not inputted, that is, in a period of time when the synchronization hold section 15 does not make the bit synchronization, the offset setting section 17 outputs a set offset voltage as a control signal for the reproduction clock generator section 18. The manner of setting of the offset voltage will be mentioned later on.

The integrator section 16 outputs data representative of a magnitude of a frequency deviation which is necessary for the setting of the offset voltage.

The reproduction clock generator section 18 controls the oscillation frequency of the VCO by the control voltage outputted from the offset setting section 17 to generate reproduction clock signals which are in turn outputted to the transmission frame timing generator section 8 and a reception frame timing generator section 19.

A data reproducing section 20 is inputted with the inversely spread reception data outputted from the matched filter 13 and outputs correct reproduction data after the synchronization catch section 14 has completed the holding of synchronization by outputting the synchronization catch completion signal. The frame synchronization correlator section 23 receives the reproduction data (in which a part of the synchronization word is formed by the pseudo-noise train for frame synchronization, as shown in FIG. 4A) and a pseudo-noise train for frame synchronization outputted from the frame synchronization pseudo-noise train generator section 24 to output a word correlation value when the value of correlation of the pseudo-noise train for frame synchronization and the reproduction data in units of one word is not smaller than a reference value. The word correlation value is inputted to the offset setting section 17, the reception frame timing generator section 19 and the transmission frame timing generator section 8.

When the word correlation value is inputted, the transmission frame timing generator section 8 and the reception frame timing generator section 19 reset the count. Thereafter, the transmission frame timing generator section 8 or the reception frame timing generator section 19 newly counts a fixed number of reproduction clocks to output a transmission frame timing signal and a transmission synchronization word timing signal (see FIG. 4C) or a reception frame timing signal and a reception sychronization word timing signal (see FIG. 4D). The reception frame timing signal and the reception sychronization word timing signal outputted from the reception frame timing generator section 19 are inputted to a frame divider section 21. The reception sychronization word timing signal is also inputted to the integrator section 16 and the offset setting section 17.

On the basis of the reception sychronization word timing signal in an "L" condition and the reception frame timing signal, the frame divider section 21 divides the reproduction data from the data reproducing section 20 into the registration data of the respective frames included therein which are in turn outputted to a CPU section 5.

Thus, the CPU section 5 receives the registration data from the reception frame and sends registration data into a transmission frame, thereby communicating with the base station or parent equipment for data concerning spread codes used and the approval of speech.

When the terminal in a wait mode sends a transmission frame in the wait mode, the transmission frame timing generator section 8 counts reproduction clock signals after resetting to output a transmission frame timing signal and a transmission synchronization word timing signal. The frame synchronization pseudo-noise train generator section 24 receives the transmission synchronization word timing signal outputted from the transmission frame timing generator 8 to output a pseudo-noise train for frame synchronization, and a selector 25 similarly receives the transmission synchronization word timing signal to output the pseudo-noise train for frame synchronization to a frame generator section 6 as it is. Thereafter, the selector 25 outputs registration data, which is outputted from the CPU section 5, to the frame generator section 6 when the transmission frame timing signal is turned to low level "L".

The frame generator section 6 forms a transmission frame as shown in FIG. 4B and outputs the formed transmission frame as transmission data. A multiplier section 10 multiplies the transmission data by a spread code outputted from the spread code generator section 9 to output it as a transmission baseband digital signal. A D/A converter section 11 receives the transmission baseband digital signal to output it after conversion into a transmission baseband analog signal.

When the base station or parent equipment receives the reception frame in the wait mode, the A/D converter section 12 of the base station or parent equipment converts a reception baseband analog signal into a reception baseband digital signal. The matched filter 13 receives the reception baseband digital signal and the spread code to inversely spread the reception baseband digital signal by the spread code, thereby outputting a correlation value. A synchronization catch section 14 receives the correlation value to output a synchronization catch completion signal in the case where the correlation value is not smaller than a reference value. When receiving the synchronization catch completion signal, a synchronization hold section 15 turns to the holding of bit synchronization to output a bit synchronization error signal. Generally, the synchronization hold section 15 is constructed by a DLL and is capable of synchronization hold at a precision which is not larger than ±½ chips for one bit.

A data reproducing section 20 is inputted with the inversely spread reception data outputted from the matched filter 13 and outputs correct reproduction data after the completion of synchronization catch. A frame synchronization correlator section 23 receives the reproduction data and a pseudo-noise train for frame synchronization outputted from the frame synchronization pseudo-noise train generator section 24 to output a word correlation value when the value of correlation of the pseudo-noise train for frame synchronization and the reproduction data in units of one word is not smaller than a reference value.

Unlike the terminal, the base station or parent equipment is not provided with an integrator section 16 and an offset setting section 17. Thus, the error signal outputted from the synchronization hold section 15 is inputted to a reproduction clock generator section 18 as a control signal of a VCO included therein, as it is. A reception frame timing generator section 19 receives reproduction clock signals to output a reception sychronization word timing signal and a reception frame timing signal. On the basis of the reception sychronization word timing signal in an "L" condition and the reception frame timing signal, a frame divider section 21 divides the reproduction data into registration data which is in turn outputted to the CPU section 5.

Explanation will now be made of an offset voltage setting procedure which is performed by the offset setting section 17 of the terminal in order to reduce the frequency deviation.

In a period of time when no error signal is outputted from the synchronization hold section 15 or in a period of time when a reception sychronization word timing signal outputted from the reception frame timing generator section 19 represents low level "L", the offset setting section 17 outputs an offset voltage to the reproduction clock generator section 18 to control the VCO. The offset voltage has a level which is different for each frame. Such an offset voltage is outputted plural times.

On the other hand, the integrator section 16 cyclically integrates a correlation value outputted from the matched filter 13 for each bit in a period of time when the reception sychronization word timing signal represents high level "H". The value of integration depends on a frequency deviation in a period of time when the preceding reception sychronization word timing signal represents low level "L". The integration value becomes large if the frequency deviation is small and becomes small if the frequency deviation is large.

The offset setting section 17 stores an offset voltage with which the maximum integration value was provided. Subsequently, the offset setting section 17 sets this voltage as an offset voltage in the period of time when no error signal is inputted.

Figure 7A:
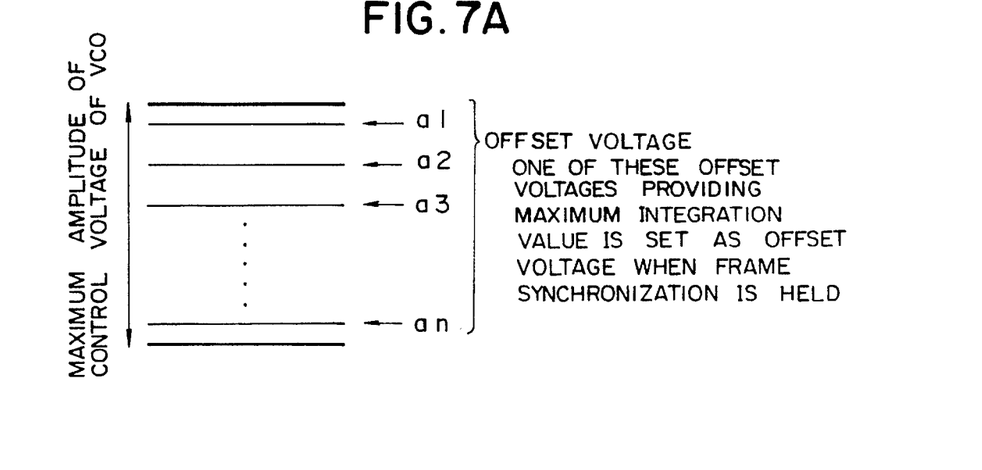
FIGS. 7A and 7B are diagrams showing various offset voltages outputted from an offset setting section of the apparatus in the embodiment of the present invention.

In the offset voltage setting process using the offset voltages with different levels, a level up to the maximum amplitude of a VCO control voltage in the reproduction clock generator section 18 is divided into a plurality of n levels $a_1, a_2, ---, a_n$, as shown in FIG. 7A. A difference between levels is set such that a precision necessary for the holding of frame synchronization is obtained.

A specific procedure until the final setting of an offset voltage by the offset setting section 17 will be explained by use of a flow chart shown in FIG. 8. Also, FIGS. 9A and 9B are time charts which explain the operation of respective parts in such a procedure or show a relationship between a reception sychronization word timing signal outputted from the reception frame timing generator section 19, a correlation value outputted from the matched filter 13, an integration value outputted from the integrator section 16 and a word correlation value outputted from the frame synchronization correlator section 23.

Figure 8:
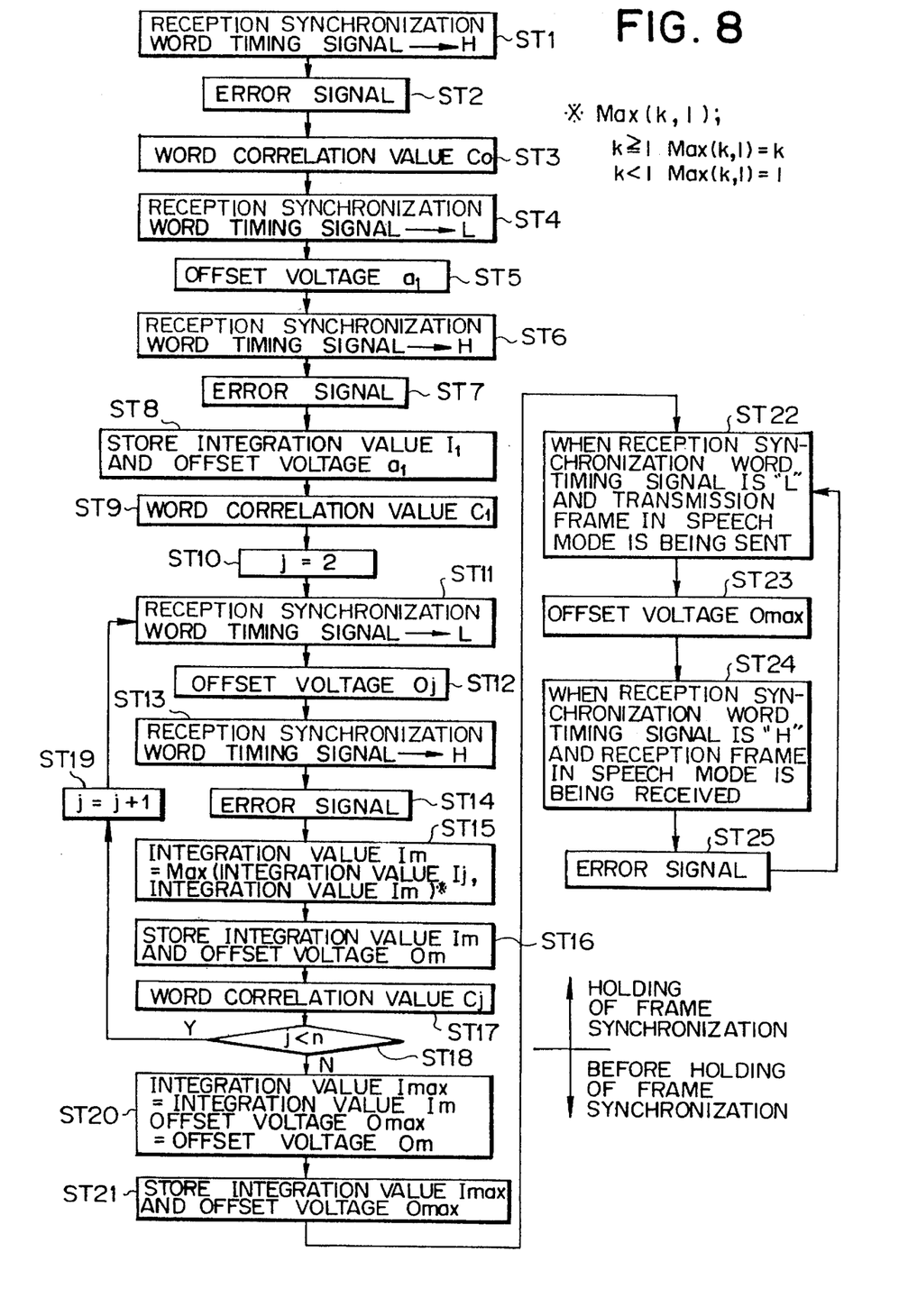
FIG. 8 is a flow chart showing an operation of the apparatus in the embodiment of the present invention until the holding of frame synchronization is made.
Figure 9A:
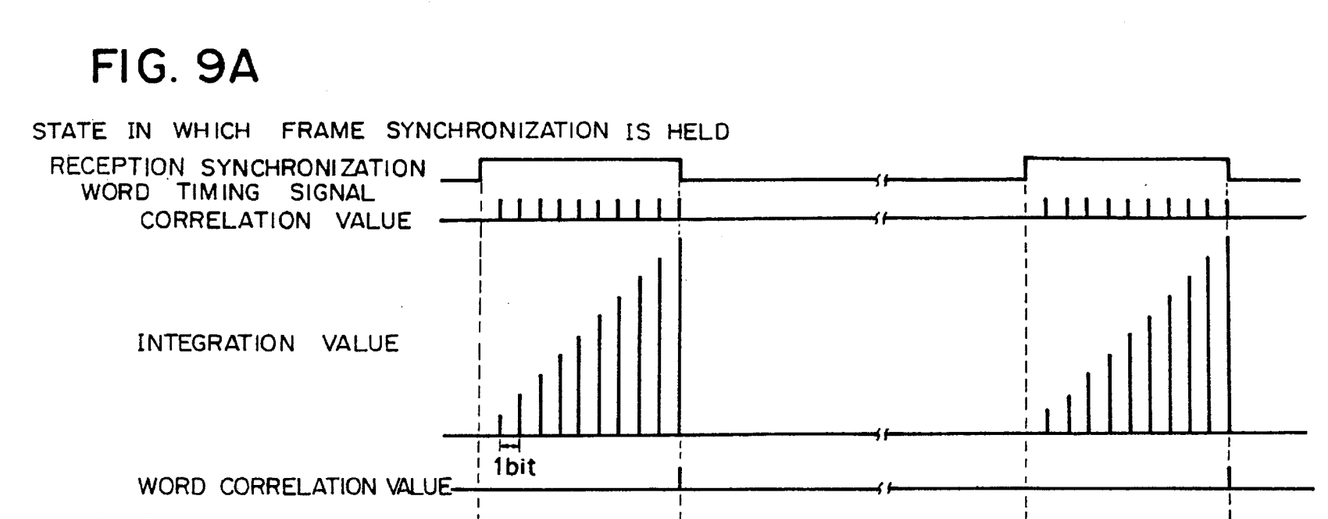
FIGS. 9A and 9B are diagrams for explaining the operation of an integrating section of the apparatus in the embodiment of the present invention.
Figure 9B:
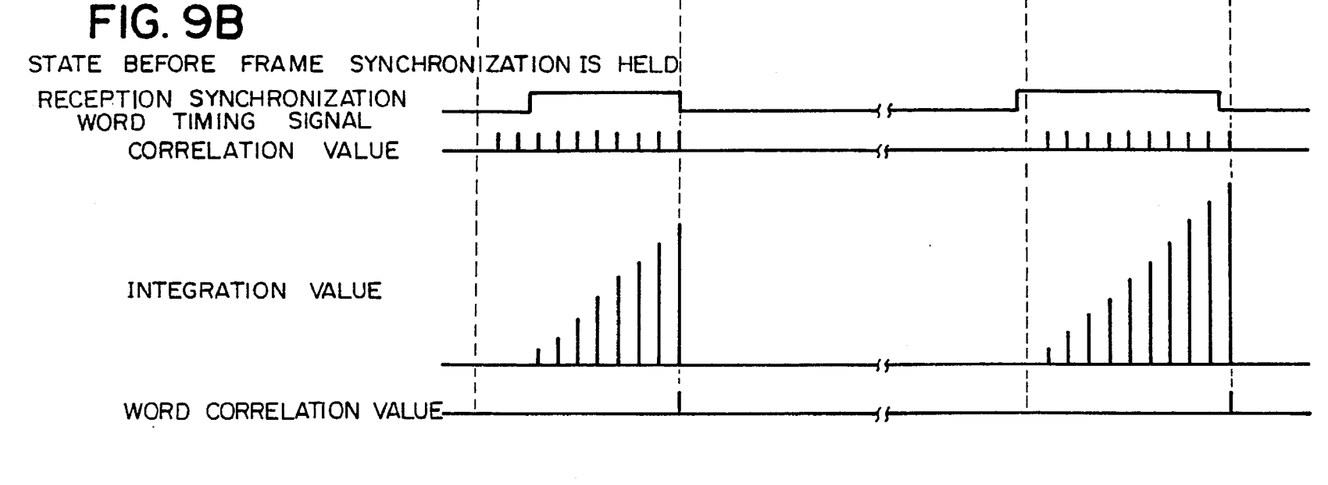

Referring to FIG. 8, a reception sychronization word timing signal (see FIG. 4D) is turned to high level "H" (step 1). In a period of time when the reception synchronization word timing signal represents high level "H", the synchronization catch section 14 performs the catch of synchronization and outputs a synchronization catch completion signal when the catch of synchronization is completed. The synchronization hold section 15 starts the holding of synchronization to output an error signal (step 2).

In the period of time when the reception synchronization word timing signal represents high level "H", the offset setting section 17 outputs the error signal, which is outputted from the synchronization hold section 15, as a control voltage signal to the reproduction clock generator section 18 as it is.

When the frame synchronization correlator section 23 outputs a word correlation value $C_0$ representative of a coincidence at a point of time when the input of the pseudo-noise train for frame synchronization is completed (step 3), the reception frame timing generator section 19 receives the word correlation value $C_0$ as a reset signal to turn the reception sychronization word timing signal to low level "L" (step 4). Herein, symbol 0 of the word correlation value $C_0$ means the zero-th.

In a period of time when the reception synchronization word timing signal represents low level "L", the offset setting section 17 outputs a fixed offset voltage $a_1$ (see FIG. 7A) as a control voltage signal (step 5). The reception frame timing generator section 19 receives reproduction clock signals generated by the offset voltage $a_1$ and outputs the next reception sychronization word timing signal when a count resumed after resetting reaches a constant number.

When the reception sychronization word timing signal is turned to high level "H" (step 6), the offset setting section 17 makes an operation similar to that in step 2 or outputs an error signal after synchronization catch to the reproduction clock generator 18 as it is (step 7). At this time, the integrator section 16 integrates a correlation value outputted from the matched filter 13 for each bit and outputs the value of integration to the offset setting section 17 which in turn stores the maximum integration value (or an integration value $I_1$) immediately before the reception sychronization word timing signal is turned to low level "L" (step 8). The integration value $I_1$ is stored together with the offset voltage $a_1$.

When a word correlation value $C_1$ outputted from the frame synchronization correlator section 23 is inputted as a reset voltage, the reception frame timing generator section 19 turns the reception sychronization word timing signal to low level "L" (step 9) while the offset setting section 17 outputs a fixed offset voltage $a_2$ as a control voltage signal of the reproduction clock generator section 18.

Thereafter, the procedure of steps 5 to 8 is repeated in a state in which the offset voltage is changed to $a_2$ (step 10). However, when the maximum integration value (or an integration value $I_2$) in the "H" period of the reception sychronization word timing signal is outputted from the integrator section 16, the offset setting section 17 compares the integration value $I_2$ with the stored integration value $I_1$ and updatedly stores a larger one of the integration values $I_1$ and $I_2$ and the offset voltage when the larger integration value was obtained.

Such a procedure is repeated plural times. Generally speaking, when the reception sychronization word timing signal is changed to low level "L" (step 11), the offset setting section 17 outputs an offset voltage $O_j$ as the control voltage signal and the reception frame timing generator section 19 counts reproduction clock signals generated by the offset voltage $O_j$ to output the next receive synchronization word timing signal (step 12). When the reception sychronization word timing signal is turned to high level "H" (step 13), the offset setting section 17 outputs an error signal outputted from the synchronization hold section 15 to the reproduction clock generator section 18 as it is (step 14).

When the maximum integration value $I_j$ in the "H" period of the reception sychronization word timing signal is outputted from the integrator section 16, the offset setting section 17 compares the integration value $I_j$ with the maximum one of previous stored integration values (step 15) and stores a larger one $I_m$ of both the integration values and an offset voltage $O_m$ with which the larger integration value $I_m$ was provided (step 16).

The frame synchronization correlator section 23 outputs a word correlation value $C_j$ as the reset signal to the reception frame timing generator section 19 (step 17). In the case where j is smaller than the number n of offset voltages with various levels set in order to determine an offset voltage which is capable of frame synchronization hold (step 18), the flow returns to step 11 to repeat the procedure of steps 11 to 17 (step 19).

In the case where j is not smaller than n (step 18), the maximum one $I_m$ of previous integration values is determined as an integration value $I_{max}$ and an offset voltage $O_m$ providing the integration value $I_m$ is determined as an offset voltage $O_{max}$ (step 20). Also, the integration value $I_{max}$ and the offset voltage $O_{max}$ are stored, thereby completing a preparatory stage for the holding of frame synchronization (step 21).

Thereafter, the offset setting section 17 outputs the offset voltage $O_{max}$ to the reproduction clock generator section 18 (step 23) when the receive synchronization word timing signal represents low level "L" and when a transmission frame in the speech mode is being sent (step 22). This offset voltage $O_{max}$ becomes an offset voltage which enables the holding of frame synchronization even if a frequency deviation is large.

When the reception sychronization word timing signal represents high level "H" and when the reception frame in the speech mode is being received (step 24), an error signal inputted from the synchronization hold section 15 is outputted to the reproduction clock generator section 18 (step 25). Thus, even in the case where the frequency deviation is large, the holding of frame synchronization at the terminal is completed in several frames in the wait mode.

An operation of the terminal until it is brought into the holding of frame synchronization can be explained as follows. If an offset voltage has a certain fixed value in a period of time when a reception synchronization word timing signal represents low level "L", a reception word timing signal outputted from the reception frame timing generator section 19 until a synchronization word of the next reception frame may deviate from a reception word timing signal upon synchronization due to a frequency deviation between reception clock signals generated by the fixed offset voltage and transmission clock signals of the base station or parent equipment. As a result, an integration value becomes small which is outputted from the integrator section 16 when the reception word timing signal represents high level "H".

This integration value becomes the maximum when the reception word timing signal outputted from the reception frame timing generator section 19 becomes substantially the same as the reception word timing signal upon synchronization.

Accordingly, if an offset voltage providing the maximum integration value is outputted from the offset setting section 17 in a period of time other than the time of input of a reception frame synchronization word in the case of the wait mode (or a reception frame in the case of the speech mode), the holding of frame synchronization can be made stably.

Figure 7B:
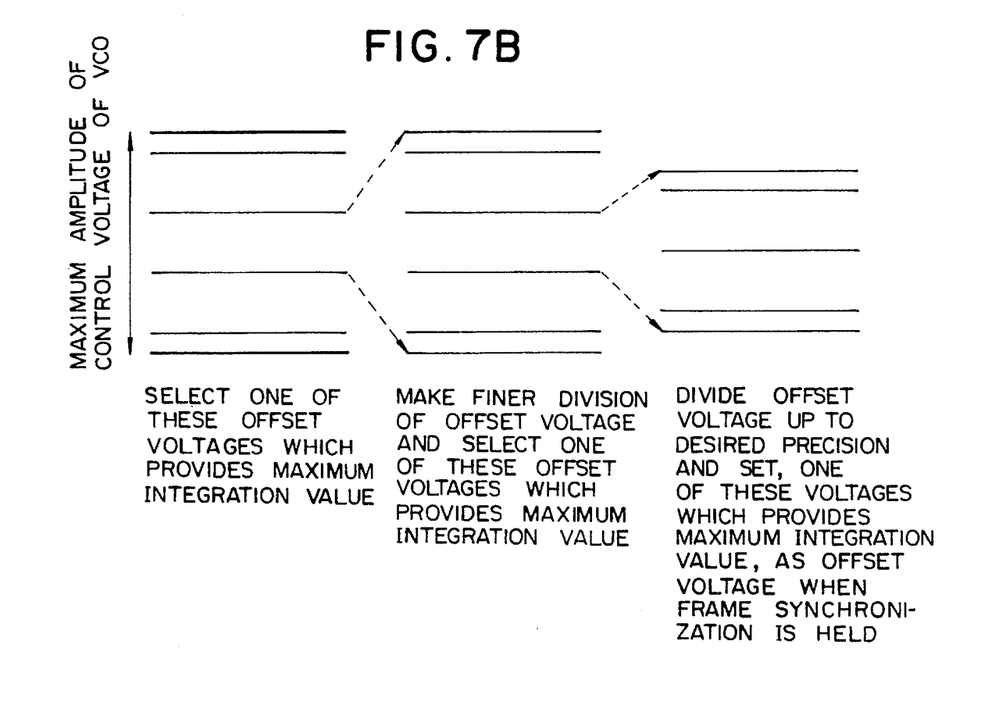

For the setting of an offset voltage, method can be employed, as shown in FIG. 7B, in which the final determination of the offset voltage to be set is rapidly made by repeating a procedure of determining that offset voltage from among a plurality of offset voltages having a coarse level difference therebetween which provides the maximum integration value, and thereafter determining that offset voltage from among a plurality of offset voltages obtained through a finer division of the level difference which provides the maximum integration value. In this case, the number of times of repetition and a level difference at each stage are determined depending on the desired precision of an offset voltage.

Thus, in the speech mode after the offset voltage has been set, the offset setting section 17 of the terminal maintains the beforehand set offset voltage value as an offset voltage when the transmission frame is to be sent. An operation of the other synchronizing system in either the base station or parent equipment or the terminal is the same as that in the case of the wait mode.

Regarding voice data, when the transmission frame is to be sent, a voice inputted by a user to the microphone 1 is converted by the CODEC section 3 into a transmission voice signal and the FIFO 4 makes the velocity conversion of the transmission voice signal so that the transmission voice signal is taken into a voice frame of the transmission frame.

The transmission frame timing generator section 8 outputs a transmission synchronization word timing signal and the frame synchronization pseudo-noise train generator section 24 receives the transmission synchronization word timing signal to output a pseudo-noise train for frame synchronization. When the transmission synchronization word timing signal represents high level "H", the selector 25 outputs the pseudo-noise train for frame synchronization outputted from the frame synchronization pseudo-noise train generator section 24 as it is. When the transmission synchronization word timing signal is changed to low level "L", the selector 25 outputs registration data and data in the data frame which are outputted from the CPU section 5.

The frame generator section 6 receives the transmission frame timing signal to form the transmission frame in which the pseudo-noise train for frame synchronization, the registration data, the data in the data frame and the transmission voice signal after velocity conversion are arranged at predetermined positions. The formed transmission frame is outputted as transmission data. The multiplier section 10 receives a spread code outputted from the spread code generator section 9 and the transmission data to output a transmission baseband digital signal after multiplication. The D/A converter section 11 converts the transmission baseband digital signal into a transmit baseband analog signal which is in turn outputted.

On the other hand, when a reception frame is received, the A/D converter section 12 converts the reception baseband analog signal into a reception baseband digital signal. The matched filter 13 makes an inverse conversion of the reception baseband digital signal by use of a spread code to output reception data. The data reproducing section 20 receives the reception data and outputs reproduction data. The frame divider section 21 receives the reproduction data and a reception frame timing signal so that the frame division of the reception frame for the reproduction data is made to output reception reproduction data and a reception signal before velocity conversion.

The reception signal before velocity conversion is subjected to velocity conversion by the FIFO 22 and is converted by the CODEC section 3 into a reception voice which is in turn outputted from the speaker 2. Also, the reception reproduction data is inputted to the CPU section 5.

As apparent from the foregoing explanation of the embodiment, the spread spectrum communication apparatus of the present invention uses the pseudo-noise train for frame synchronization in order to make frame synchronization. Therefore, it is possible to rapidly and surely establish the frame synchronization in the base station or parent equipment or the terminal. In the case of an apparatus in which a frequency deviation between transmission and reception clock signals is small, it is possible to surely establish the frame synchronization fundamentally in one frame even on the terminal side.

Also, in the case where the frequency deviation between transmission and reception clock signals is large, a construction for setting an offset voltage makes it possible to avoid a situation in which the holding of frame synchronization becomes impossible. Thereby, the holding of frame synchronization can be made stably. Therefore, even in the case where a communication based on a TDD system is made, the reproduction of data can be made surely, thereby avoiding an inconvenience that the receiving side is short of reception data.

Further, a time required for the setting of the offset voltage can be shortened by using the pseudo-noise train for frame synchronization.

I claim:

1. A spread spectrum communication apparatus comprising:

frame synchronization pseudo-noise train generating means for generating a pseudo-noise train for frame synchronization;

reception frame timing generating means for outputting a reception frame timing signal necessary for reproduction of a reception frame and a reception synchronization word timing signal representative of an instant of time of insertion of the pseudo-noise train into said reception frame;

de-spread means for de-spreading a signal that is input into said de-spread means;

data reproducing means for producing reception reproduction data from an output signal of said de-spread means; and frame synchronization correlation means, receiving the pseudo-noise train outputted from said frame synchronization pseudo-noise train generating means and the reception reproduction data outputted from said data reproducing means, for determining a value of correlation of the pseudo-noise train and the reception reproduction data and outputting a word correlation value when said value of correlation is not smaller than a reference value.

2. A spread spectrum communication apparatus according to claim 1, further comprising:

frame generating means for generating a transmission frame;

CPU means for supplying registration data; and selecting means for alternately providing (i) an output of said frame synchronization pseudo-noise train generating means and (ii) an output of said CPU means to said frame generating means.

3. A spread spectrum communication apparatus in which frame synchronization is established by inserting data for frame synchronization as a part of a synchronization word of a transmission frame on a sending side and detecting the data for frame synchronization from reproduction data of a reception frame on a receiving side, the spread spectrum communication apparatus comprising:

frame synchronization pseudo-noise train generating means for generating a pseudo-noise train used as said data for frame synchronization;

de-spread means for de-spreading a signal that is input into said de-spread means;

data reproducing means for producing said reproduction data from an output signal of said de-spread means;

frame synchronization correlation means, receiving the pseudo-noise train outputted from said frame synchronization pseudo-noise train generating means and the reproduction data, for determining a value of correlation of the pseudo-noise train for frame synchronization and the reproduction data and providing an output signal when said value of correlation is not smaller than a reference value; and reception frame timing generating means for outputting a reception synchronization word timing signal based on a reference signal comprising the output signal of said frame synchronization correlation means.

4. A spread spectrum communication apparatus according to claim 3, further comprising:

integrating means for integrating the reproduction data when said reception synchronization word timing signal is being outputted and outputting an integration value;

reproduction clock generating means of the receiving side for generating reproduction clock signals having a frequency which is controlled by a control voltage;

offset setting means for setting an offset value of the control voltage for said reproduction clock generating means of the receiving side based on said integration value outputted from said integrating means.

* * * * *